(12) United States Patent
Park

(10) Patent No.: US 11,186,340 B2
(45) Date of Patent: Nov. 30, 2021

(54) FOLDING STRUCTURE OF PERSONAL MOBILITY DEVICE AND PERSONAL MOBILITY DEVICE INCLUDING THE SAME

(71) Applicants: Hyundai Motor Company, Seoul (KR); Kia Motors Corporation, Seoul (KR)

(72) Inventor: Jun Hwan Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 200 days.

(21) Appl. No.: 16/693,256

(22) Filed: Nov. 23, 2019

(65) Prior Publication Data

US 2020/0331555 A1   Oct. 22, 2020

(30) Foreign Application Priority Data

Apr. 17, 2019  (KR) .......................... 10-2019-0044656

(51) Int. Cl.
  *B62K 15/00*  (2006.01)
  *B62K 3/00*   (2006.01)

(52) U.S. Cl.
  CPC ............ *B62K 15/008* (2013.01); *B62K 3/002* (2013.01); *B60Y 2200/126* (2013.01)

(58) Field of Classification Search
  None
  See application file for complete search history.

(56) References Cited

U.S. PATENT DOCUMENTS

| | | | | |
|---|---|---|---|---|
| 8,801,009 | B2 * | 8/2014 | Sapir | B62K 3/002 280/87.05 |
| 10,328,986 | B2 * | 6/2019 | Koo | B62J 50/10 |
| 10,486,763 | B2 * | 11/2019 | Koo | B62K 15/008 |
| 2018/0118299 | A1 * | 5/2018 | Lu | B62K 21/16 |

FOREIGN PATENT DOCUMENTS

| | | | | |
|---|---|---|---|---|
| CN | 206954414 U | * | 2/2018 | ............. B62K 3/002 |
| WO | 2016/043556 A1 | | 3/2016 | |

\* cited by examiner

*Primary Examiner* — Kevin Hurley
(74) *Attorney, Agent, or Firm* — Mintz Levin Cohn Ferris Glovsky and Popeo, P.C.; Peter F. Corless

(57) ABSTRACT

A folding structure of a personal mobility device includes a front foot plate having an internal space and a hinge shaft at an upper end of a rear end. A rear foot plate includes a hinge shaft overlapping the front foot plate hinge shaft, at an upper end of a front end, being folded over the front foot plate or unfolded there-behind by rotating about the hinge shafts, and extending in a front foot plate extension plane when rotating to be unfolded. Apertures are formed at a rear end portion of the front foot plate. Insert protrusions protrude from a front end portion of the rear foot plate and are inserted into the internal space through the apertures when the rear foot plate is rotated to be unfolded. Locking members are disposed in the internal space, fix the insert protrusions by locking thereto, or release the fixed insert protrusions.

16 Claims, 7 Drawing Sheets

FOLDING STRUCTURE OF PERSONAL MOBILITY DEVICE AND PERSONAL MOBILITY DEVICE INCLUDING THE SAME

CROSS-REFERENCE TO RELATED APPLICATION

This application claims the priority benefit of Korean Patent Application No. 10-2019-0044656, filed on Apr. 17, 2019, the disclosure of which is incorporated herein by reference.

BACKGROUND

1. Field of the Disclosure

The present disclosure relates to a folding structure of a personal mobility device and a personal mobility device including the folding structure, particularly, to a folding structure of a foot plate fixed in an unfolded state or foldably coupled thereto.

2. Description of the Prior Art

Recently, personal vehicles referred to as personal mobility devices have been increasingly developed due to the problem of environmental pollution and an increase in demand accompanying entertaining use. A vehicle referred to as a kickboard is widely used as an example of a personal mobility device and a kickboard includes a foot plate having wheels and a handle unit having a handle.

Personal mobility devices of the related art that include a foot plate and a handle unit such as a kickboard have a folding structure for driving etc., and particularly, have folding structures that fold a foot plate in various ways. In particular, personal mobility devices of the related art have folding structures including a locking structure that uses levers, a fitting structure that uses coupling pins, a linkage structure that uses combination of links, and a sleeve structure that uses sliding. However, the personal mobility devices of the related art have problems in that foreign substances may become stuck between levers or links and it may be difficult to manage the gap of a coupling structure for fixing in an unfolded state.

The description provided above as a related art of the present disclosure is merely for helping understanding the background of the present disclosure and should not be construed as being included in the related art known by those skilled in the art.

SUMMARY

The present disclosure provides a folding structure of a personal mobility device that secures waterproof ability and has improved durability and convenience of assembly through a simplified structure.

In view of an aspect, a folding structure of a personal mobility device according to the present disclosure may include: a front foot plate that extends in a plane, having an internal space, and having a hinge shaft at an upper end of a rear end; a rear foot plate having a hinge shaft, which overlaps the hinge shaft of the front foot plate, at an upper end of a front end, being folded over the front foot plate or unfolded behind the front foot plate by rotating about the hinge shafts, and that extends in a plane in which the front foot plate extends when rotating relatively to be unfolded behind the front foot plate; apertures formed at a rear end portion of the front foot plate and communicating with the internal space of the front foot plate from the outside; insert protrusions that protrude from a front end portion of the rear foot plate and are inserted into the internal space of the front foot plate through the apertures when the rear foot plate is rotated relatively to be unfolded behind the front foot plate; and locking members disposed in the internal space of the front foot plate, fixing the insert protrusions by locking to the insert protrusions inserted in the front foot plate through the apertures, or releasing the fixed insert protrusions.

The apertures and the insert protrusions may be positioned respectively at a lower end of the rear end portion of the front foot plate or the lower end of the front end portion of the rear foot plate to be spaced in a vertical direction separated from the hinge shafts. Latching jaws that protrude downward with the rear foot plate unfolded behind the front foot plate may be formed at ends of the insert protrusions, and the locking members may be coupled to the front foot plate to be able to rotate relatively in the internal space of the front foot plate and may be latched by the latching jaws by the relative rotation or may be released by rotating relatively down further than the latching jaws.

The insert protrusions and the latching jaws may laterally extend, the locking members may extend in the vertical direction, and first ends that are latched by the latching jaws of the locking members may bend laterally in the extension direction of the insert protrusions or the latching jaws. The laterally bent first ends of the locking members may form latching surfaces of which front surfaces are inclined rearward as they go upward. The laterally extending latching jaws may form latching surfaces of which the rear surfaces are inclined rearward as they go upward.

The hinge shafts each may include an empty space or cavity formed therein, second ends of the locking members may extend into the hinge shafts, and the folding structure may further include switches with first ends inserted in the hinge shafts in contact with the second ends of the locking members and second ends extending to be exposed out of the hinge shafts, and rotate the locking members by sliding in the hinge shafts. The apertures and the insert protrusions may be formed each by two pieces and laterally spaced from each other, respectively, the locking members may be formed by two pieces to respectively fix the insert protrusions or release the insert protrusions, and the switches may be disposed at both ends of the hinge shafts to be exposed out of the hinge shafts and to be in contact with the second ends of different locking members, respectively.

The folding structure may further include elastic members disposed between the locking members and the front foot plate and applying elasticity to the locking members in a direction in which the locking members are latched by the latching jaws. The latching jaws that protrude downward at the insert protrusions may be formed such that front surfaces are inclined rearward as they go downward.

The overlapping hinge shafts of the front foot plate and the rear foot plate may laterally extend, a spacing space may be formed between both ends, and the folding structure may further include a cable that extends from the internal space of the front foot plate to be exposed to the spacing space and that extends further to be connected to the internal space of the rear foot plate from the spacing space. The folding structure may further include inner walls formed in front of the hinge shafts in the front foot plate to divide the internal space of the front foot plate or formed behind the hinge shafts in the rear foot plate to divide the internal space of the rear foot plate, and the cable may extend through the inner walls through cable glands.

In view of another aspect, a personal mobility device according to the present disclosure may include the folding structure of a personal mobility device according to the present disclosure and may further include a handle unit coupled to the front end of the front foot plate to be able to be folded over the rear foot plate when the rear foot plate has been folded over the front foot plate. Handle bars may be disposed at an upper end of the handle unit and the handle bars may be rotated on the handle unit to be closed to the rear end of the front foot plate with the handle unit folded over the rear foot plate.

According to the folding structure of a personal mobility device of the present disclosure and personal mobility device including the folding structure, there is an effect in that since the insert protrusions are disposed on the rear foot plate positioned relatively high, the possibility of damage to the insert protrusions with the rear foot plate unfolded may be reduced.

Further, when the rear foot plate is unfolded and fixed to the front foot plate, tension may be applied to the insert protrusions and compressive force may be applied to the locking members, to increase durability in comparison to the structures of the related art in which bending force and shear force is applied. Further, the first ends of the locking members are rotated toward the latching jaws under the latching jaws like wedges, thereby supporting the insert protrusions. Accordingly, there is an effect of reduction of gaps when the locking members are locked.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
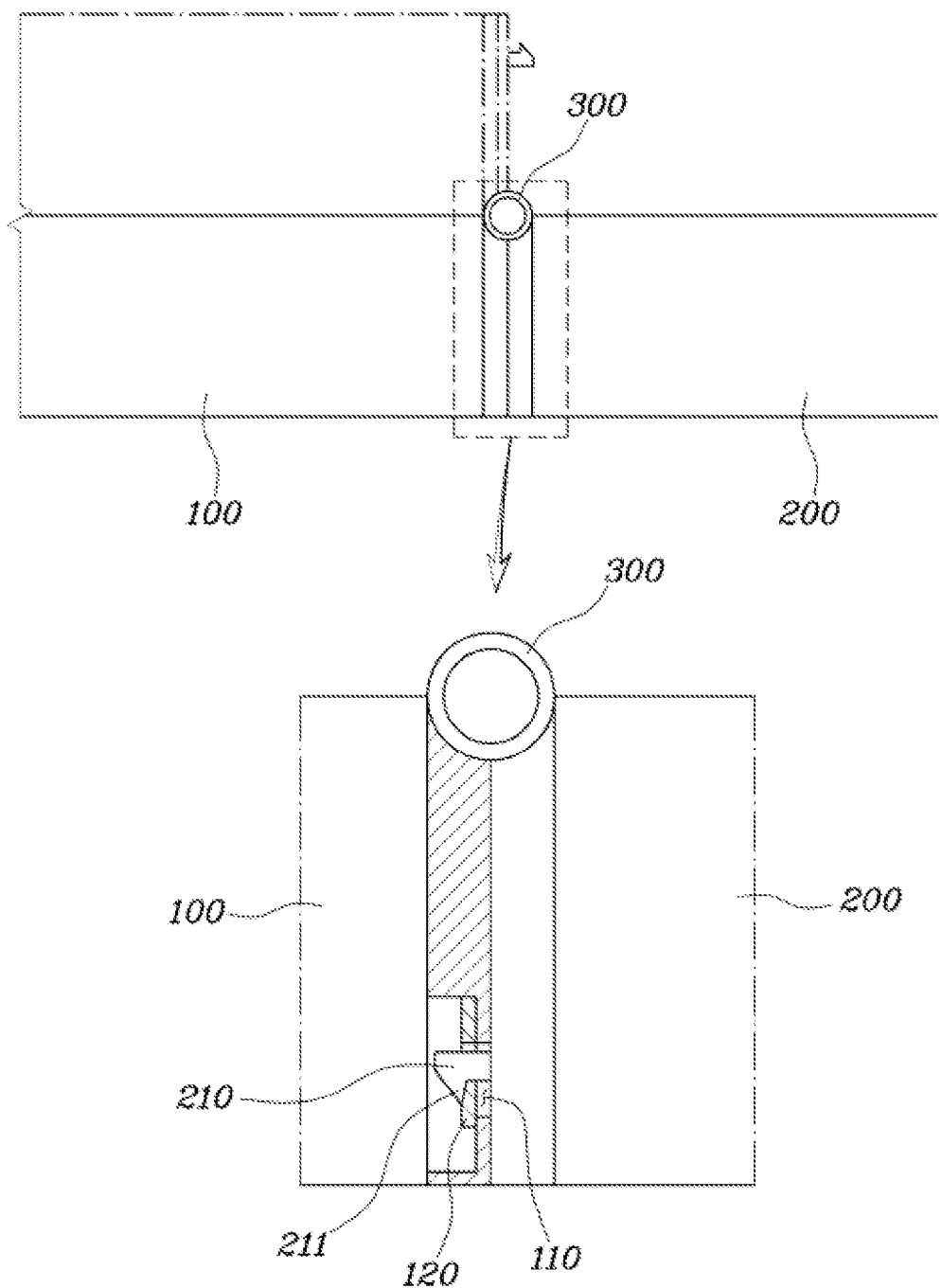
FIG. 1 is a side cross-sectional view of a folding structure of a personal mobility device according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A specific structural or functional description of embodiments of the present disclosure disclosed in the specification or application is given merely for the purpose of describing the exemplary embodiment according to the present disclosure. Therefore, the exemplary embodiments according to the present disclosure may be implemented in various forms, and the present disclosure should not be construed as being limited to the exemplary embodiments described in the specification or application.

Various changes and modifications may be made to the exemplary embodiments according to the present disclosure, and therefore particular exemplary embodiments will be illustrated in the drawings and described in the specification or application. However, it should be understood that exemplary embodiments according to the concept of the present disclosure are not limited to the particular disclosed exemplary embodiments, but the present disclosure includes all modifications, equivalents, and alternatives falling within the spirit and scope of the present disclosure.

Although the terms "ordinal numbers" such as first, second and the like may be used to describe various elements, the elements should not be defined by the terms. The terms are merely used to distinguish an element from another element, and thus a first element may be named a second element while the second element may be similarly named the first element, without departing from the scope of protection according to the concept of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to other component, it should be understood that there is no component therebetween. The other expressions of describing a relation between structural elements, i.e. "between" and "merely between" or "neighboring" and "directly neighboring", should be interpreted similarly to the above description.

In the present specification, the terms are merely used to describe a specific embodiment, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that generally understood by a person skilled in the art to which the present disclosure belongs. It should be interpreted that the terms, which are identical to those defined in general dictionaries, have the meaning identical to that in the context of the related technique. The terms should not be ideally or excessively interpreted as a formal meaning unless not clearly defined.

Hereinafter, an exemplary embodiment of the present disclosure will be described in detail with reference to the accompanying drawings. Similar reference numerals presented in the drawings denote similar elements.

Figure 2:
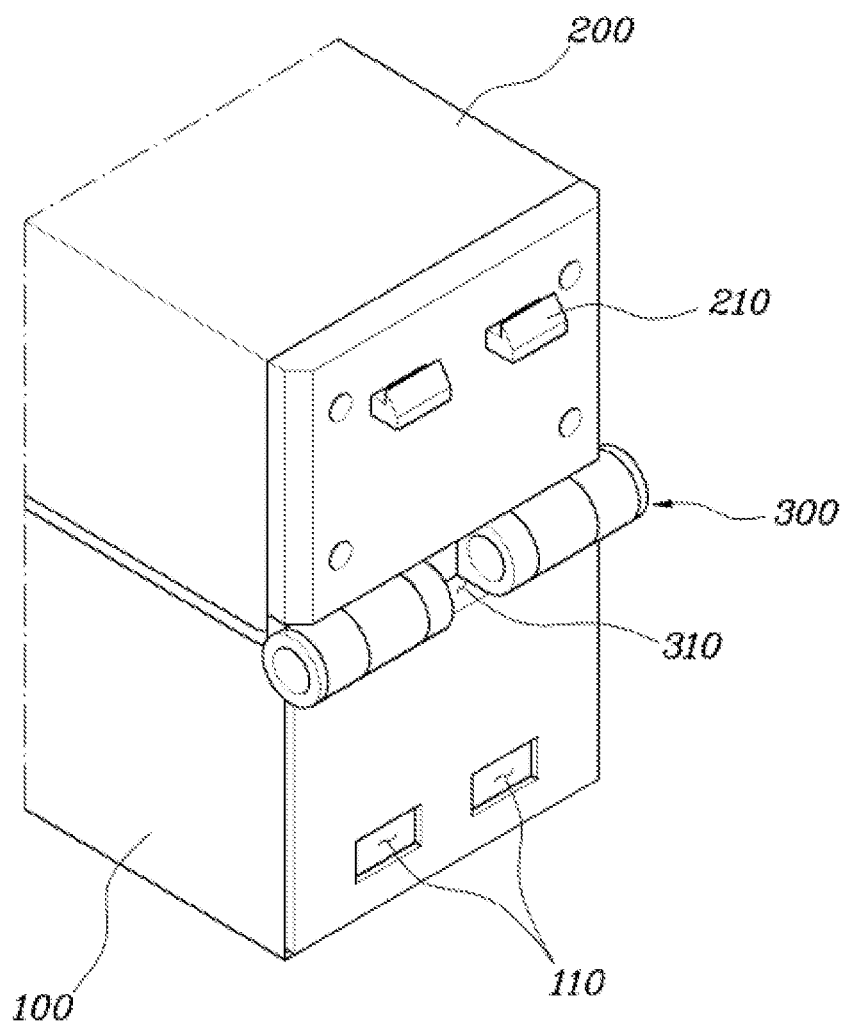
FIG. 2 is a rear perspective view showing a folded state of the folding structure of a personal mobility device according to an exemplary embodiment of the present disclosure.

FIG. 1 is a side cross-sectional view of a folding structure of a personal mobility device according to an exemplary embodiment of the present disclosure and FIG. 2 is a rear perspective view showing a folded state of the folding structure of a personal mobility device according to an exemplary embodiment of the present disclosure. In particular, the solid lines indicate a state when a rear foot plate 200 has been unfolded from a front foot plate 100 and the dashed dotted lines indicate a state when the rear foot plate 200 has been folded over the front foot plate 100.

Referring to FIGS. 1 and 2, a folding structure of a personal mobility device according to an embodiment of the present disclosure includes: a front foot plate 100 extending in a plane, having an internal space, and having a hinge shaft 300 at the upper end of the rear end; a rear foot plate 200 having a hinge shaft 300, which overlaps the hinge shaft 300 of the front foot plate 100, at the upper end of the front end, being folded over the front foot plate 100 or unfolded behind the front foot plate 100 by rotating about the hinge shafts 300, and extending in the plane in which the front foot plate 100 extends when relatively rotating to be unfolded behind the front foot plate 100; apertures 110 formed at the rear end portion of the front foot plate 100 and communicating with the internal space of the front foot plate 100 from the outside; insert protrusions 210 protruding from the front end portion of the rear foot plate 200 and being inserted into the internal space of the front foot plate 100 through the apertures 110 when the rear foot plate 200 is relatively rotated to be unfolded behind the front foot plate 100; and locking members 120 disposed in the internal space of the front foot plate 100, fixing the insert protrusions 210 by locking to the insert protrusions 210 inserted in the front foot plate 100 through the apertures 110, or releasing the fixed insert protrusions 210.

The front foot plate 100 and the rear foot plate 200 may extend in a plane that is parallel to the ground when unfolded with respect to each other, and thus, a foot plate may be provided on which a user may ride. The front foot plate 100 and the rear foot plate 200 may be coupled to each other to be able to rotate about the hinge shafts 300 overlapping each other. In other words, the front foot plate 100 and the rear foot plate 200 may be unfolded or folded toward each other. In particular, the front foot plate 100 and the rear foot plate 200 may be folded such that the tops when the plates are unfolded come in contact with each other.

The hinge shafts 300 may be respectively disposed at the upper end of the rear end of the front foot plate 100 and at the upper end of the front end of the rear foot plate 200, and the rear foot plate 200 may be folded over the front foot plate 100 or unfolded behind the front foot plate 100 by rotation about the hinge shafts 300. The front foot plate 100 and the rear foot plate 200 each may be box-shaped with four sides surrounded by walls to form an internal space therein (e.g., a cavity). Parts for driving wheels such as a motor, a battery, a controller may be mounted in the internal space of the front foot plate 100 and the internal space of the rear foot plate 200. Further, cables 500 that connect the internal spaces may be included, which will be described below.

The apertures 110 may be formed through the outer wall of the rear end portion of the front foot plate 100 to communicate with the internal space of the front foot plate 100. When the rear foot plate 200 is rotated relatively to the front foot plate 100 to be unfolded behind the front foot plate 100, the insert protrusions 210 may be inserted into the internal space of the front foot plate 100 through the apertures 110. The locking members 120 may prevent separation of the insert protrusions 210 inserted into the internal space of the front foot plate 100 with the rear foot plate 200 unfolded behind the front foot plate 100. Accordingly, the rear foot plate 200 may be fixed in the unfolded state behind the front foot plate 100.

In particular, the locking members 120 may fix the insert protrusions 210 by locking to the insert protrusions 210. The locking members 120 may partially close the apertures 210 when locked to the insert protrusions 210. Further, the locking members 120 may be locked to the insert protrusions 210 to be able to unlock, and may allow for separation of the insert protrusions 210 when unlocked. When the locking members 120 are unlocked from the insert protrusions 210, the locking members 120 may move out of the apertures 110 not to close (e.g., block) the apertures 110.

Accordingly, separation of the insert protrusions 210 may be prevented to restrict rotation of the rear foot plate 200 through the locking structure of the simple locking members 120. Further, since the insert protrusions 210 may be disposed on the rear foot plate 200 positioned relatively high, the possibility of damage to the insert protrusions 210 with the rear foot plate 200 unfolded may be reduced.

Figure 3:
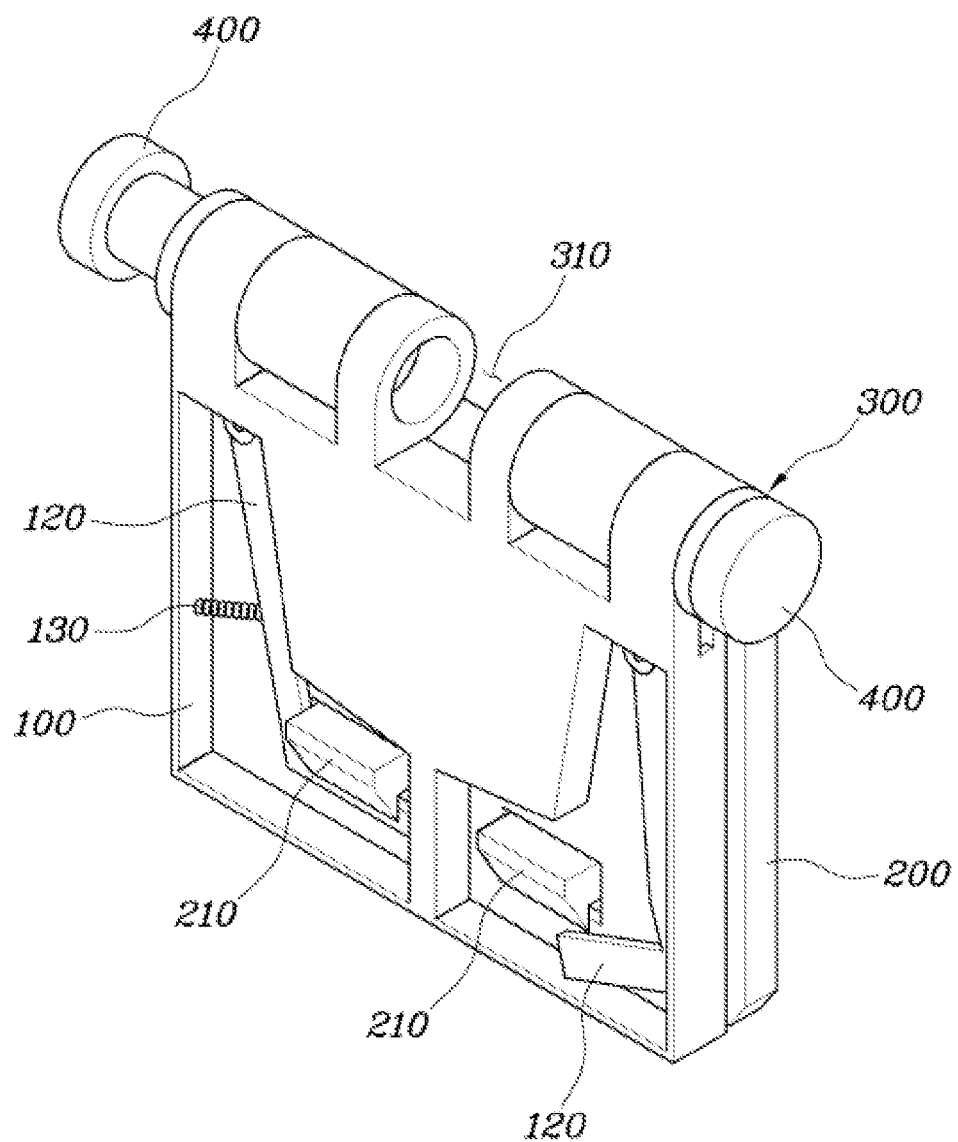
FIG. 3 is a perspective view showing a locking structure of the folding structure of a personal mobility device according to an exemplary embodiment of the present disclosure.
Figure 4:
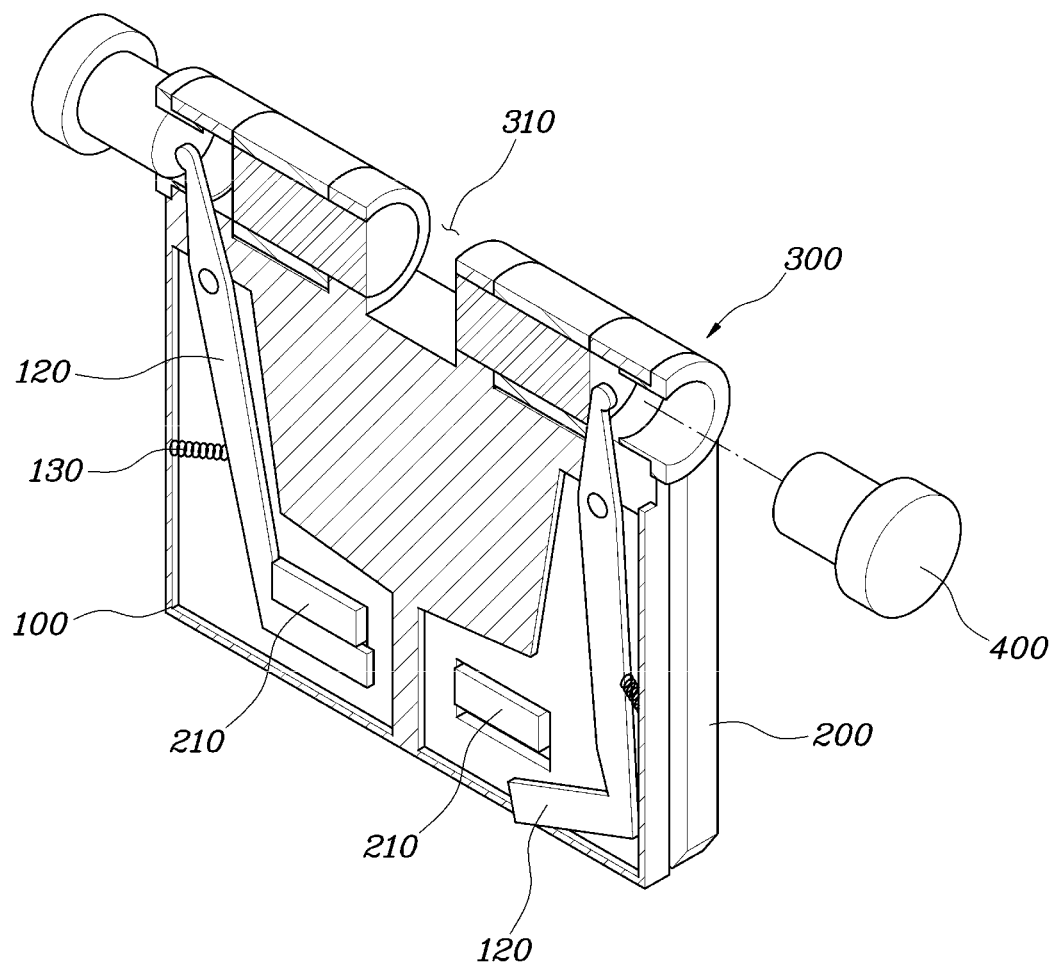
FIG. 4 is a cross-sectional view of FIG. 3 according to an exemplary embodiment of the present disclosure.

FIG. 3 is a perspective view showing a locking structure of the folding structure of a personal mobility device according to an exemplary embodiment of the present disclosure and FIG. 4 is a cross-sectional view of FIG. 3. In particular, FIGS. 3 and 4 show the state when the locking member 120 is locked at the left side and show the state when the locking member 120 is unlocked at the right side. Referring to FIGS. 3 and 4, the apertures 110 and the insert protrusions 210 may be positioned respectively at the lower end of the rear end portion of the front foot plate 100 or the lower end of the front end portion of the rear foot plate 200 to be spaced in the vertical direction apart from the hinge shafts 300.

The insert protrusions 210 may be positioned at the lower end of the front end portion of the rear foot plate 200 and the apertures 110 may be correspondingly positioned at the lower end of the rear end portion of the front foot plate 100. Accordingly, the insert protrusions 210 and the locking members 120 may be locked at positions spaced apart from the hinge shafts 300 that are the rotary shafts between the front foot plate 100 and the rear foot plate 200, thereby providing a stable support.

Latching jaws 211 that protrude downward with the rear foot plate 200 unfolded behind the front foot plate 100 may be formed at ends of the insert protrusions 210 and the locking members 120 may be coupled to the front foot plate 100 to be able to rotate relatively in the internal space of the front foot plate 100. Accordingly, the locking members 120 may be latched by the latching jaws 211 by relative rotation or may be released by relatively rotating down further than the latching jaws 211. The latching jaws 211 may be formed at the rear ends, which protrude behind the rear foot plate 200, of the insert protrusions 210, and may protrude downward. In particular, the latching jaws 211 may protrude downward is a stepwise manner.

Accordingly, when the rear foot plate 200 is unfolded and fixed to the front foot plate 100, tension may be applied to the insert protrusions 210 and compressive force may be applied to the locking members 120, thus increasing durability compared to the structures of the related art in which bending force and shear force is applied. The locking members 120 may be rotatably coupled to the front foot plate 100. In particular, the locking members 120 may be positioned close or proximate to the rear end of the front foot plate 100 in the front foot plate 100 and may be rotated in a plane parallel with the rear end surface.

The locking members 120 may be inserted under the insert protrusions 210 to be latched by the latching jaws 211 by rotating relative to the front foot plate 100, thereby being able to fix the insert protrusions 210. Further, the locking members 120 may be unlocked from the insert protrusions 210 by rotating down further than the latching jaws 211, thereby being able to unlock the insert protrusions 210.

The insert protrusions 210 and the latching jaws 211 may extend laterally, the locking members 120 may extend in the vertical direction, and first ends that are latched by the latching jaws 211 of the locking members 120 may bend laterally in the extension direction of the insert protrusions 210 or the latching jaws 211. Additionally, the insert protrusions 210 may extend laterally, the latching jaws 211 may be formed at the insert protrusions 210 to extend in the same direction, and the locking members 120 may extend laterally in parallel with the latching jaws 211 when latched by the latching jaws 211.

Particularly, the first ends of the locking members 120 may bend to laterally extend in parallel with the latching jaws 211 when rotated relative to the front foot plate 100 to be latched by the latching jaws 211. Further, the locking members 120 may extend in the vertical direction and second ends thereof may extend toward the hinge shafts 300. The rotary shafts of the locking members 120 may be positioned at the second ends close or proximate to the hinge shafts 300.

The hinge shafts 300 each have an empty space or cavity therein and the second ends of the locking members 120 may extend into the hinge shafts 300. The folding structure of a personal mobility device may further include switches 400 having first ends inserted in the hinge shafts 300 in contact with the second ends of the locking members 120 and second ends that extend to be exposed out of the hinge shafts 300, and rotate the locking members 120 by sliding in the hinge shafts 300. The hinge shafts 300 may be formed such that the rotary shafts of the front foot plate 100 and the rear foot plate 200 overlap each other, and may have an empty space or cavity therein. The locking members 120 may extend such that the second ends thereof are positioned in the hinge shafts 300.

The first ends of the switches 400 may be inserted in the empty spaces formed in the hinge shafts 300. In other words, the front foot plate 100 and the rear foot plate 200 may rotate to fold or unfold with the switches 400 therebetween. The first ends of the switches 400 may be in contact with the second ends of the locking members 120. The second ends of the switches 400 may extend along the hinge shafts 300 to be exposed out of the hinge shafts 300. When the switches 400 slide in the hinge shafts 300, the second ends of the locking members 120 may be moved along the hinge shafts 300, and thus, locking members 120 may be rotated relatively with respect to the front foot plate 100.

In particular, when the second ends of the switches 400 are pressed and inserted into the hinge shafts 300, the locking members 120 are moved down and off the latching jaws 211 of the insert protrusions 210, and thus, the locking members 120 may be unlocked. Accordingly, by sliding the second ends exposed out of the hinge shafts 300 of the switches 400, it may be possible to rotate the locking members 120 and more easily unlock the locking members 120 and the insert protrusions 210 from each other. In particular, the rotary shafts of the locking members 120 may be disposed proximate to the hinge shafts 300, and thus, even when the switches 400 slide a short distance, the locking members 120 may be rotated substantially.

The laterally bent first ends of the locking members 120 may form latching surfaces of which the front surfaces are inclined rearward as they go upward. The first ends of the latching jaws 120 that are latched by the latching jaws 211 may have latching surfaces on the front surfaces that latch to the rear surfaces of the latching jaws 211, and the latching surfaces of the locking members 120 may incline rearward as they go upward. Further, the laterally extending latching jaws 211 may form latching surfaces of which the rear surfaces are inclined rearward as they go upward.

Latching surfaces may be formed on the rear surfaces of the latching jaws 211 that latch the locking members 120 and the latching surfaces of the latching jaws 211 may be inclined rearward as they go upward. In particular, the latching surfaces of the locking members 120 and the latching jaws 211 may be inclined at the same angle. Accordingly, the first ends of the locking members 120 may be rotated toward the latching jaws 211 under the latching jaws 211 like wedges, thereby supporting the insert protrusions 210 to prevent separation of the insert protrusions 210. Accordingly, gaps may be reduced when the locking members 210 are locked. Further, pre-pressure may be generated and applied to the locking members 120 in the locking direction to the latching jaws 211 by the elasticity of elastic members 130 to be described below, and thus, the gap may be reduced.

The apertures 110 and the insert protrusions 210 may each be formed by two pieces and may be laterally spaced from each other, respectively, the locking members 120 may be formed by two pieces to respectively fix the insert protrusions 210 or release the insert protrusions 210, and the switches 400 may be disposed at both ends of the hinge shafts 300 to be exposed out of the hinge shafts 300 and to be in contact with the second ends of different locking members 120, respectively.

In other words, two switches 400 may be disposed respectively at both ends of the hinge shafts 300. Accordingly, a user may easily rotate the locking members 120 by simultaneously pressing both ends of the switches 400. Further, even when any one of the switches 400 is operated incorrectly, the locking members 120 are not unlocked by the other one, and thus, the front foot plate 100 and the rear foot plate 200 may remain fixed in the unfolded state. The apertures 110 and the insert protrusions 210 may each be provided by two pieces and disposed laterally in parallel with the ground. The insert protrusions 210 may be moved simultaneously with the second ends in contact with different locking members 120, respectively, to thus rotate the insert protrusions 210.

The folding structure of a personal mobility device may further include elastic members 130 disposed between the locking members 120 and the front foot plate 100 and configured to apply elasticity to the locking members 120 in the direction in which the locking members 120 are latched by the latching jaws 211. The elastic members 130 may be disposed between the locking members 120 and the front foot plate 100 to fix first ends to the locking members 120 and fix second ends to the front foot plate 100.

In particular, the elastic members 130 may prevent deformation after the first ends of the locking members 120 extend in the extension direction of the latching jaws 211 and the locking members 120 and the latching jaws 211 are completely latched by each other. Accordingly, when the switches 400 slide and the locking members 120 are rotated to be unlocked from the latching jaws 211, elasticity may be applied in the direction in which the locking members 120 are latched by the latching jaws 211.

Accordingly, the locking members 120 may remain locked to the insert protrusions 210, and may be unlocked from the insert protrusions 210 only when force greater than the elasticity of the elastic member 130 is applied to the switches 400. In particular, since pre-pressure is applied in the direction in which the locking members 120 are locked to the insert protrusions 210 through the inclined latching surfaces, the gaps between the insert protrusions 210 and the locking members 120 may be reduced. In particular, the elastic member 130 may be a plurality of springs and the springs may be manufactured integrally with the locking members 120 by laser cutting. For example, the springs may be made of stainless steel.

Additionally, since the assembly processes and the number of parts are reduced, convenience of assembly may be improved. Further, the latching jaws 211 that protrude downward at the insert protrusions 210 may be formed such that the front surfaces are inclined rearward as they go downward. The insert protrusions 210 inserted through the apertures 110 may be inserted into the internal space of the front foot plate 100 with the front surfaces thereof positioned forward when the rear foot plate 200 is rotated behind the front foot plate 100 from the top of the front foot plate 100.

In particular, when the elastic members 130 are maintained without deformation with the insert protrusions 210 separated out of the apertures 110, the first ends of the locking members 120 may partially cover the apertures 110. While the insert protrusion 210 are inserted, the front surfaces of the latching jaws 211 may come in contact with the rear surfaces of the first ends of the locking members 120. When the rear foot plate 200 is rotated rearward to be unfolded, the locking members 120 slide and rotate on the front surface of the latching jaws 211 that are inclined rearward as they go downward, thereby being able to allow insertion of the insert protrusions 210. Accordingly, even though the switches 400 are not operated, when the insert protrusions 210 are inserted into the internal space of the front foot plate 100 through the apertures 110, the locking members 120 may allow for insertion into the internal space of the front foot plate 100 while deforming the elastic members 130.

Figure 5:
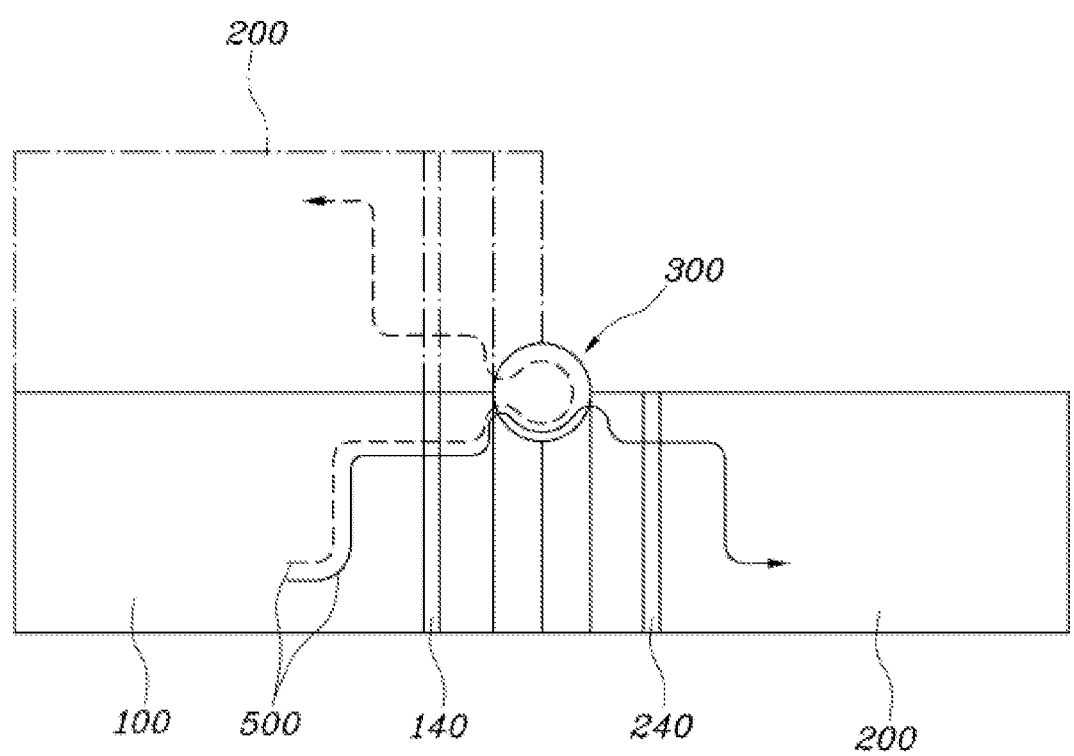
FIG. 5 is a view showing a cable extending in the folding structure of the personal mobility device according to an exemplary embodiment of the present disclosure.

FIG. 5 is a view showing a cable 500 that extends in the folding structure of the personal mobility device according to an exemplary embodiment of the present disclosure. Referring to FIG. 5, the overlapping hinge shafts 300 of the front foot plate 100 and the rear foot plate 200 extend laterally, a spacing space 310 may be formed between both ends, and the folding structure of a personal mobility device may further include a cable 500 that extends from the internal space of the front foot plate 100 to be exposed to the spacing space 310 and further extending to be connected to the internal space of the rear foot plate 200 from the spacing space 310.

The hinge shafts 300 may be separated to form the spacing space or cavity 310 between both ends. The spacing space 310 may be an empty space or cavity without an overlapping configuration in the front foot plate 100 or the rear foot plate 200. The cable 500 may extend to connect the internal spaces of the front foot plate 100 or the rear foot plate 200. In particular, the cable 500 exposed to the outside through the spacing space 310 from the internal space of the front foot plate 100 may further extend into the internal space of the rear foot plate 200 from the spacing space 310. Accordingly, exposure of the cable 500 may be minimized, and thus, the aesthetic appearance may be improved and the waterproof ability for the internal spaces of the front foot plate 100 or the rear foot plate 200 may be improved. Further, strain due to bending of the cable 500 may be reduced.

The folding structure of a personal mobility device may further include inner walls 140 and 240 formed ahead of the hinge shafts 300 in the front foot plate 100 to divide the internal space of the front foot plate 100 or formed behind the hinge shafts 300 in the rear foot plate 200 to divide the internal space of the rear foot plate 200, and the cable 500 may extend through the inner walls 140 and 240 through cable glands. The inner wall 140 may divide the internal space of the front foot plate 100. In particular, the inner wall 140 may separate the space formed forward and the space where the locking members 120 etc. are disposed in the internal space of the front foot plate 100.

Additionally, the inner wall 240 may divide the internal space of the rear foot plate 200. In particular, the inner wall 240 may separate the space formed rearward and the space formed forward in the internal space of the rear foot plate 200. Parts that particularly require waterproof ability may be mounted in the space formed forward in the internal space of the front foot plate 100 and the space formed rearward in the internal space of the rear foot plate 200. In particular, ends of the cable 500 that particularly require waterproof ability may connect the space formed forward in the internal space of the front foot plate 100 and the space formed rearward in the internal space of the rear foot plate 200 through the inner walls 140 and 240. The cable glands of the cable 500 may be formed at the inner walls 140 and 240 and the cable 500 may extend through the inner walls 140 and 240 through the cable glands. Accordingly, it may be possible to further secure waterproof ability.

Figure 6:
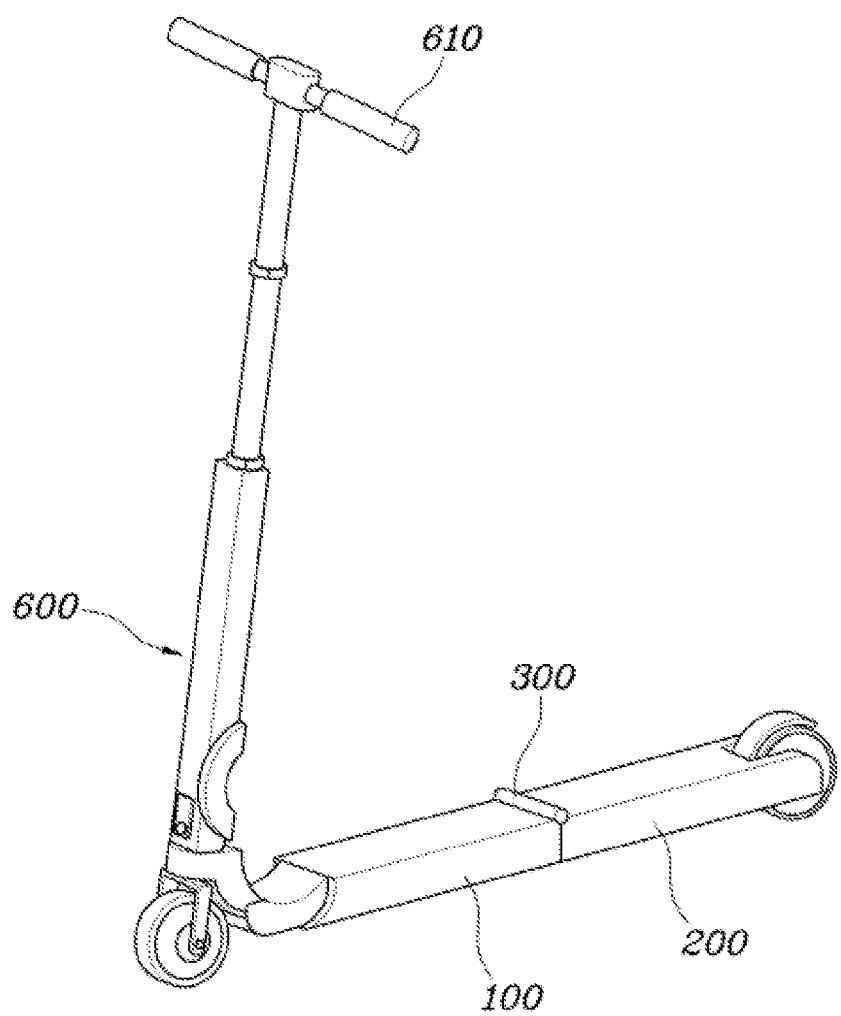
FIG. 6 is a view showing an unfolded state of the personal mobility device according to an exemplary embodiment of the present disclosure.
Figure 7:
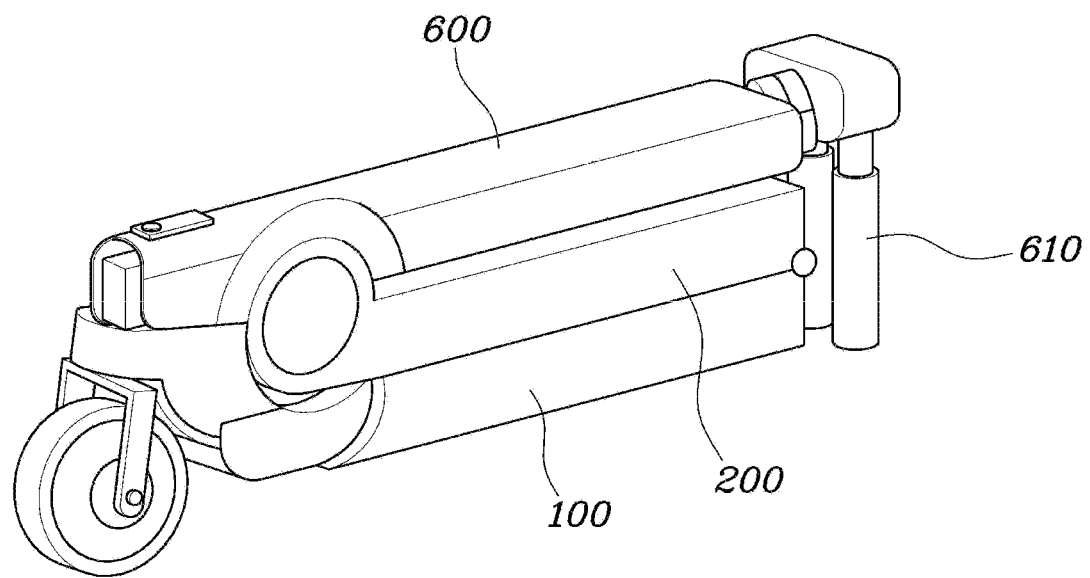
FIG. 7 is a view showing a folded state of the personal mobility device according to an exemplary embodiment of the present disclosure.

FIG. 6 is a view showing an unfolded state of the personal mobility device according to an exemplary embodiment of the present disclosure and FIG. 7 is a view showing a folded state of the personal mobility device according to an exemplary embodiment of the present disclosure. Referring to FIGS. 6 and 7, the personal mobility device according to an exemplary embodiment of the present disclosure may include the folding structure of a personal mobility device according to an exemplary embodiment of the present disclosure and may further include a handle unit 600 coupled to the front end of the front foot plate 100 to be able to be folded over the rear foot plate 200 when the rear foot plate 200 has been folded over the front foot plate 100.

In particular, handle bars 610 may be disposed at the upper end of the handle unit. The handle bars 610 may be rotated on the handle unit 600 to be closed toward the rear end of the front foot plate 100 with the handle unit 600 folded over the rear foot plate 200. Accordingly, when the rear foot plate 200 is folded over the front foot plate 100 and the handle bars 610 are closed to each other with the handle unit 600 folded over the rear foot plate 200, a user may hold the handle bars 610 positioned at the rear end of the front foot plate 100 and spaced from the insert protrusions having the latching jaws, thereby providing an effect of preventing an injury.

Although the present disclosure has been described and illustrated with reference to the particular exemplary embodiments thereof, it will be apparent to those skilled in the art that various improvements and modifications of the present disclosure can be made without departing from the technical idea of the present disclosure provided by the following claims.

What is claimed is:

1. A folding structure of a personal mobility device, comprising:
    a front foot plate that extends in a plane, having an internal space, and having a hinge shaft at an upper end of a rear end thereof;
    a rear foot plate having a hinge shaft, which overlaps the hinge shaft of the front foot plate, at an upper end of a front end thereof, being folded over the front foot plate or unfolded behind the front foot plate by rotating about the hinge shafts, and extending in a plane in which the front foot plate extends when rotating to be unfolded behind the front foot plate;
    apertures formed at a rear end portion of the front foot plate and communicating with the internal space of the front foot plate from the outside;
    insert protrusions that protrude from a front end portion of the rear foot plate and being inserted into the internal space of the front foot plate through the apertures when the rear foot plate is rotated to be unfolded behind the front foot plate; and
    locking members disposed in the internal space of the front foot plate, and fixing the insert protrusions by locking to the insert protrusions inserted in the front foot plate through the apertures, or releasing the fixed insert protrusions.

2. The folding structure of claim 1, wherein the apertures are positioned at a lower end of the rear end portion of the front foot plate, and wherein the insert protrusions are positioned at a lower end of the front end portion of the rear foot plate to be spaced apart from the hinge shafts in a vertical direction.

3. The folding structure of claim 1, wherein latching jaws protruding downward with the rear foot plate unfolded behind the front foot plate are formed at ends of the insert protrusions, and the locking members are coupled to the front foot plate to be able to rotate in the internal space of the front foot plate and are latched by the latching jaws by rotating or are released by rotating down further than the latching jaws.

4. The folding structure of claim 3, wherein the insert protrusions and the latching jaws extend laterally, and the locking members extend in the vertical direction, and first ends that are latched by the latching jaws of the locking members bend laterally in the extension direction of the insert protrusions or the latching jaws.

5. The folding structure of claim 4, wherein the laterally bent first ends of the locking members form latching surfaces of which front surfaces are inversely inclined.

6. The folding structure of claim 4, wherein the laterally extending latching jaws form latching surfaces of which the rear surfaces are inversely inclined.

7. The folding structure of claim 4, wherein the hinge shafts each have an empty space therein and second ends of the locking members extend into the hinge shafts.

8. The folding structure of claim 7, wherein the folding structure further includes
    switches that have first ends inserted in the hinge shafts in contact with the second ends of the locking members and second ends that extend to be exposed out of the hinge shafts, and rotate the locking members by sliding in the hinge shafts.

9. The folding structure of claim 8, wherein the apertures and the insert protrusions are each formed by two pieces and are laterally spaced from each other, respectively, the locking members are formed by two pieces to respectively fix the insert protrusions or release the insert protrusions, and the switches are disposed at both ends of the hinge shafts to be exposed out of the hinge shafts and to be in contact with the second ends of different locking members, respectively.

10. The folding structure of claim 3, further comprising:
    elastic members disposed between the locking members and the front foot plate and configured to apply elasticity to the locking members in a direction in which the locking members are latched by the latching jaws.

11. The folding structure of claim 10, wherein the latching jaws protruding downward at the insert protrusions are formed with front surfaces inversely inclined.

12. The folding structure of claim 1, wherein the overlapping hinge shafts of the front foot plate and the rear foot plate extend laterally, and a spacing space is formed between both ends.

13. The folding structure of claim 12, wherein the folding structure further includes:
    a cable that extends from the internal space of the front foot plate to be exposed to the spacing space and further extending to be connected to the internal space of the rear foot plate from the spacing space.

14. The folding structure of claim 13, further comprising:
    inner walls formed in front of the hinge shafts in the front foot plate to divide the internal space of the front foot plate or formed behind the hinge shafts in the rear foot plate to divide the internal space of the rear foot plate, wherein the cable extends through the inner walls through cable glands.

15. A personal mobility device comprising the folding structure of a personal mobility device of claim 1, and further comprising:
    a handle unit coupled to the front end of the front foot plate to be folded over the rear foot plate when the rear foot plate is folded over the front foot plate.

16. The personal mobility device of claim 15, wherein handle bars are disposed at an upper end of the handle unit and the handle bars are rotated on the handle unit to be closed toward the rear end of the front foot plate with the handle unit folded over the rear foot plate.

* * * * *